United States Patent
Lee et al.

(10) Patent No.: US 8,743,320 B2
(45) Date of Patent: Jun. 3, 2014

(54) IN-PLANE SWITCHING MODE LIQUID CRYSTAL DISPLAY DEVICE INCLUDING POLARIZING PLATE AND METHOD OF FABRICATING THE SAME

(75) Inventors: Jun-Hee Lee, Gyeonggi-do (KR); Jae-Hyun Lee, Busan (KR)

(73) Assignee: LG Display Co., Ltd., Seoul (KR)

(*) Notice: Subject to any disclaimer, the term of this patent is extended or adjusted under 35 U.S.C. 154(b) by 1009 days.

(21) Appl. No.: 12/630,380

(22) Filed: Dec. 3, 2009

(65) Prior Publication Data
US 2010/0157207 A1 Jun. 24, 2010

(30) Foreign Application Priority Data
Dec. 23, 2008 (KR) .................. 10-2008-0132544

(51) Int. Cl.
*G02F 1/1335* (2006.01)
(52) U.S. Cl.
USPC .............................. 349/96; 349/117; 349/118
(58) Field of Classification Search
USPC ........................................... 349/96, 117, 118
See application file for complete search history.

(56) References Cited

U.S. PATENT DOCUMENTS

| | | | | |
|---|---|---|---|---|
| 5,883,685 A | * | 3/1999 | Mazaki et al. | 349/117 |
| 6,034,755 A | * | 3/2000 | Watanabe | 349/118 |
| 6,064,457 A | * | 5/2000 | Aminaka | 349/117 |
| 6,977,696 B2 | * | 12/2005 | Amimori et al. | 349/112 |
| 7,532,283 B2 | * | 5/2009 | Yano et al. | 349/117 |
| 2005/0110933 A1 | | 5/2005 | Jeon et al. | |
| 2007/0154654 A1 | | 7/2007 | Greener et al. | |
| 2008/0239213 A1 | * | 10/2008 | Ohmuro et al. | 349/96 |
| 2009/0180059 A1 | | 7/2009 | Fukuda et al. | |

FOREIGN PATENT DOCUMENTS

| | | |
|---|---|---|
| CN | 1645205 A | 7/2005 |
| CN | 1721940 A | 1/2006 |
| JP | 2000-227520 A | 8/2000 |
| KR | 10-2005-0049137 A | 5/2005 |
| KR | 10-2008-0081007 A | 9/2008 |
| KR | 10-2008-0086480 A | 9/2008 |

OTHER PUBLICATIONS

KIPO—Office Action for Korean Patent Application No. 10-2008-0132544—issued on Jan. 25, 2013.
Chinese Office Action dated May 12, 2011, with English translation.

* cited by examiner

*Primary Examiner* — Huyen Ngo
(74) *Attorney, Agent, or Firm* — Morgan, Lewis & Bockius LLP

(57) ABSTRACT

An in-plane switching mode liquid crystal display device includes: first and second substrates facing and spaced apart from each other; a first polarizing plate including a supporting layer, a first polarizing layer and a first protecting layer sequentially on an outer surface of the first substrate; a second polarizing plate including a first compensating layer, a second compensating layer, a second polarizing layer and a second protecting layer sequentially on an outer surface of the second substrate, the first and second compensating layers including positive and negative biaxial retardation films, respectively; and a liquid crystal layer between the first and second substrates.

5 Claims, 16 Drawing Sheets

IN-PLANE SWITCHING MODE LIQUID CRYSTAL DISPLAY DEVICE INCLUDING POLARIZING PLATE AND METHOD OF FABRICATING THE SAME

This application claims the benefit of Korean Patent Application No. 2008-0132544 filed on Dec. 23, 2008, which is hereby incorporated by reference in its entirety.

BACKGROUND OF THE INVENTION

1. Field of the Invention

The present application relates to a liquid crystal display device, and more particularly, to an in-plane switching mode liquid crystal display device and a method of fabricating the in-plane switching mode liquid crystal display device.

2. Discussion of the Related Art

As information age progresses, display devices processing and displaying a large amount of information has been developed. Specifically, flat panel display (FPD) devices have been required for satisfying characteristics such as light weight, thin profile, and low power consumption. As a result, a liquid crystal display (LCD) devices having advantages in color reproducibility and profile have been suggested.

The LCD device uses the optical anisotropy and polarization properties of liquid crystal molecules to produce an image. Since the liquid crystal molecules have long thin shapes and a pretilt angle for alignment, the alignment direction of the liquid crystal molecules can be controlled by changing the pretilt angle due to an applied voltage. Accordingly, the alignment of the liquid crystal molecules changes in accordance with the alignment direction of the liquid crystal molecules controlled by applying a voltage to a liquid crystal layer. As a result, the image is displayed by modulating a polarized light due to the optical anisotropy of the liquid crystal molecules. Among several types of LCD devices, active matrix LCD (AM-LCD) devices where thin film transistors (TFTs) and pixel electrodes connected to the TFTs are disposed in matrix are currently widely used because of their high resolution and superior quality for displaying moving pictures.

A related art LCD device includes a color filter substrate having a common electrode, an array substrate having a pixel electrode, and a liquid crystal layer interposed between the color filter substrate and the array substrate. In the related art LCD device, the liquid crystal layer is driven by a vertical electric field between the pixel electrode and the common electrode. The related art LCD device provides a superior transmittance and a high aperture ratio. However, the related art LCD device has a narrow viewing angle because it is driven by the vertical electric field. To overcome the above disadvantages, various other types of LCD devices having wide viewing angles, such as in-plane switching mode (IPS) mode LCD device, have been developed.

FIG. 1A is a cross-sectional view of the related art in-plane switching mode liquid crystal display device in an ON state, and FIG. 1B is a cross-sectional view of the related art in-plane switching mode liquid crystal display device in an OFF state.

In FIGS. 1A and 1B, an in-plane switching (IPS) mode liquid crystal display (LCD) device 10 includes a first substrate 20 having a thin film transistor (not shown), a second substrate 30 having a color filter layer and a black matrix and a liquid crystal layer 40 between the first and second substrates 20 and 30. A common electrode 22 and a pixel electrode 24 are alternately formed on the first substrate 20. An electric field E is generated according to a voltage applied to the common electrode 22 and the pixel electrode 24, and liquid crystal molecules 40a and 40b of the liquid crystal layer 40 are re-aligned along the electric field E.

In the ON state of FIG. 1A, the voltage is applied to the common electrode 22 and the pixel electrode 24, and the electric field E is generated. The electric field E has a vertical portion directly over the common electrode 22 and the pixel electrode 24, and a horizontal portion between the common electrode 22 and the pixel electrode 24. Accordingly, the first liquid crystal molecules 40a directly over the common electrode 22 and the pixel electrode 24 are not re-aligned, and the second liquid crystal molecules 40b between the common electrode 22 and the pixel electrode 24 are re-aligned along the electric field E. Since the liquid crystal layer 40 between the common electrode 22 and the pixel electrode 24 is re-aligned along the horizontal portion of the electric field E in the ON state, the IPS mode LCD device 10 displays images with a wide viewing angle. For example, the images may be displayed with a viewing angle of about 80° to about 85° along top, bottom, right and left directions with respect to a normal direction of the IPS mode LCD device.

In the OFF state of FIG. 1B, since the voltage is not applied to the common electrode 22 and the pixel electrode 24, and the electric field E is not generated. Accordingly, the first and second liquid crystal molecules 40a and 40b of the liquid crystal layer 40 are not re-aligned.

In the IPS mode LCD device according to the related art, a polarization state of the light passing through the IPS mode LCD device is adjusted by first and second polarizing plates on outer surfaces of the first and second substrates, respectively.

FIG. 2 is a cross-sectional view showing an in-plane switching mode liquid crystal display device according to the related art.

In FIG. 2, an in-plane switching (IPS) mode liquid crystal display (LCD) device 10 includes first and second substrates 20 and 30 facing and spaced apart from each other, and a liquid crystal layer 40 between the first and second substrates 20 and 30. Although not shown in FIG. 2, a common electrode and a pixel electrode generating an electric field are formed on an inner surface of the first substrate 20.

In addition, first and second polarizing plates 52 and 54 are formed on outer surfaces of the first and second substrates 20 and 30, respectively. The first polarizing plate 52 includes a first supporting layer 52a, a first polarizing layer 52b and a first protecting layer 52c, and the second polarizing plate 54 includes a second supporting layer 54a, a second polarizing layer 54b and a second protecting layer 54c. Each of the first and second supporting layers 52a and 54a includes tri-acetyl cellulose (TAC) having a retardation of about 0. Each of the first and second polarizing layers 52b and 54b determining a polarization property is formed by stretching poly-vinyl alcohol (PVA) adsorbing iodine (I) or dye. Each of the first and second protecting layers 52c and 54c also includes TAC.

When the first and second polarizing plates 52 and 54 are disposed such that absorption axes of the first and second polarizing plates 52 and 54 are perpendicular to each other, the IPS mode LCD device is operated in a normally black mode. Accordingly, when the IPS mode LCD device 10 has an OFF state, the horizontal electric field is not generated between the common electrode and the pixel electrode, and the liquid crystal molecules of the liquid crystal layer 40 are not re-aligned so that the incident light can penetrate the liquid crystal layer 40 without polarization. As a result, the linearly-polarized light passing through the first polarizing plate 52 to have a polarization axis perpendicular to the absorption axis of the first polarizing plate 52 penetrates the liquid crystal layer 40 without change of polarization state, and is completely absorbed by the second polarizing plate 54 having an absorption axis perpendicular to the absorption axis of the first polarizing plate 52, thereby a black image displayed.

When the IPS mode LCD device has an OFF state, although the black image is displayed along a normal direction of the IPS mode LCD device, the brightness of the black image along up, down, right and left oblique directions of the IPS mode LCD device may increase due to light leakage. The light leakage is generated because the absorption axes of the polarizing plates are not perpendicular to each other.

FIGS. 3A and 3B are views showing absorption axes of polarizing plates of an in-plane switching mode liquid crystal display device according to the related art when viewed at a normal viewing angle and at an oblique viewing angle, respectively.

In FIG. 3A, when an in-plane switching (IPS) mode liquid crystal display (LCD) device 10 (of FIG. 2) is viewed at a normal viewing angle, a first absorption axis ABS1 of a first polarizing plate 52 on an outer surface of a first substrate 20 (of FIG. 2) and a second absorption axis ABS2 of a second polarizing plate 54 on an outer surface of a second substrate 30 (of FIG. 2) cross each other with a first angle a1.

In FIG. 3B, however, when the IPS mode LCD device 10 is viewed at an oblique viewing angle, the first absorption axis ABS1 of the first polarizing plate 52 and the second absorption axis ABS2 of the second polarizing plate 54 cross each other with a second angle a2 greater than the first angle a1. Accordingly, the first absorption axis ABS1 of FIG. 3B for the obliquely incident light to the IPS mode LCD device 10 is counterclockwise rotated with respect to the first absorption axis ABS1 of FIG. 3A for the normally incident light to the IPS mode LCD device 10, and the second absorption axis ABS2 of FIG. 3B for the obliquely incident light to the IPS mode LCD device 10 is clockwise rotated with respect to the second absorption axis ABS2 of FIG. 3A for the normally incident light to the IPS mode LCD device 10.

As a result, the obliquely incident light to the IPS mode LCD device 10 passes through the first polarizing plate 52 and is linearly polarized to have a polarization state having a polarization axis PL perpendicular to the first absorption axis ABS1 of FIG. 3B. However, since the polarization axis PL is not parallel to the second absorption axis ABS2, the obliquely incident light is not absorbed by the second polarizing plate 54 to cause the light leakage. Therefore, when the IPS mode LCD device 10 is viewed along up, down, right and left oblique directions, the luminosity of the black image is deteriorated due to the light leakage, thereby contrast ratio reduced.

FIG. 4 is a Poincare sphere showing polarization states of obliquely incident light to an in-plane switching mode liquid crystal display device according to the related art, and FIG. 5 is a view showing a brightness contour line of a black image with respect to a viewing angle in an in-plane switching mode liquid crystal display device according to the related art.

In FIG. 4, the obliquely incident light to an in-plane switching (IPS) mode liquid crystal display (LCD) device passes through a first polarizing plate 52 (of FIG. 2) and is linearly polarized to have a polarization state having a polarization axis PL perpendicular to a first absorption axis ABS1. Since a second absorption axis ABS2 of a second polarizing plate 54 (of FIG. 2) is not perpendicular to the first absorption axis ABS1, the polarization axis PL is located at different position in the Poincare sphere from the second absorption axis ABS2. Accordingly, the obliquely incident light does not display a complete black image and light leakage occurs.

In FIG. 5, the first polarizing plate 52 and the second polarizing plate 54 are disposed such that the first absorption axis ABS1 and the second absorption axis ABS2 are parallel to a horizontal direction and a vertical direction, respectively. When the IPS mode LCD device displays a black image, a complete black image without light leakage is viewed at a normal viewing angle having a polar angle θ of about 0° with respect to a z-axis normal to the IPS mode LCD device. However, a light leakage occurs at an oblique viewing angle along diagonal directions having azimuthal angles φ of about 45°, 135°, 225° and 315° with respect to an or a y-axis parallel to the IPS mode LCD device. Accordingly, brightness of the black image increases and contrast ratio is reduced at the oblique viewing angle of the IPS mode LCD device. For example, the black image may have relatively high brightness of about 0.018331 (arbitrary unit: A.U.) at an oblique viewing angle having a polar angle of about 60° and an azimuthal angle of about 45°. Although a compensation film having a complex retardation is used for the IPS mode LCD device to solve the above problems, the retardation film causes complication in fabrication process and increase in fabrication cost.

SUMMARY OF THE INVENTION

Accordingly, the present invention is directed to an in-plane switching mode liquid crystal display device and a method of fabricating the same that substantially obviates one or more of the problems due to limitations and disadvantages of the related art.

An object of the present invention is to provide an in-plane switching mode liquid crystal display device where brightness of a black image at an oblique viewing angle is reduced and contrast ratio is improved and a method of fabricating the in-plane switching mode liquid crystal display device.

Another object of the present invention is to provide an in-plane switching mode liquid crystal display device where a biaxial film having a retardation value is used as a supporting layer of a polarizing plate and a method of fabricating the in-plane switching mode liquid crystal display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching mode liquid crystal display device includes: first and second substrates facing and spaced apart from each other; a first polarizing plate including a supporting layer, a first polarizing layer and a first protecting layer sequentially on an outer surface of the first substrate; a second polarizing plate including a first compensating layer, a second compensating layer, a second polarizing layer and a second protecting layer sequentially on an outer surface of the second substrate, the first and second compensating layers including positive and negative biaxial retardation films, respectively; and a liquid crystal layer between the first and second substrates.

In another aspect, an in-plane switching mode liquid crystal display device includes: first and second substrates facing and spaced apart from each other; a first polarizing plate including a first compensating layer, a first polarizing layer and a first protecting layer sequentially on an outer surface of the first substrate, the first compensating layer including a positive biaxial retardation film; a second polarizing plate including a second compensating layer, a second polarizing layer and a second protecting layer sequentially on an outer surface of the second substrate, the second compensating layer including a positive biaxial retardation film; and a liquid crystal layer between the first and second substrates.

In another aspect, a method of fabricating an in-plane switching mode liquid crystal display device includes: forming a liquid crystal layer between first and second substrates facing and spaced apart from each other; forming a first polarizing plate including a supporting layer, a first polarizing layer and a first protecting layer on an outer surface of the first substrate; and forming a second polarizing plate including a first compensating layer, a second compensating layer, a second polarizing layer and a second protecting layer on an outer surface of the second substrate, the first and second compensating layers including positive and negative biaxial retardation films, respectively.

In another aspect, a method of fabricating an in-plane switching mode liquid crystal display device includes: forming a liquid crystal layer between first and second substrates facing and spaced apart from each other; forming a first polarizing plate including a first compensating layer, a first polarizing layer and a first protecting layer on an outer surface of the first substrate, the first compensating layer including a positive biaxial retardation film; and forming a second polarizing plate including a second compensating layer, a second polarizing layer and a second protecting layer on an outer surface of the second substrate, the second compensating layer including a positive biaxial retardation film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to the embodiments of the present invention, examples of which are illustrated in the accompanying drawings. Wherever possible, similar reference numbers will be used to refer to the same or similar parts.

Figure 1A:
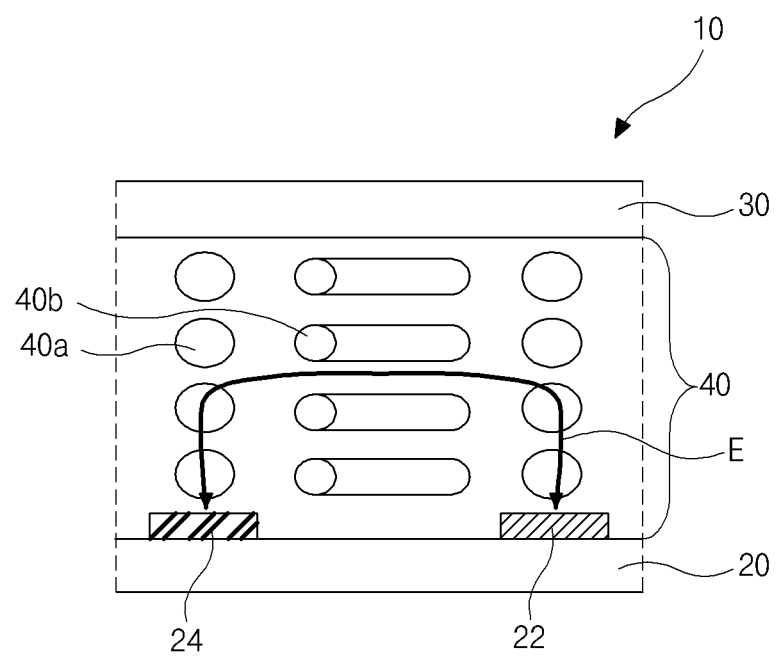
FIG. 1A is a cross-sectional view of the related art in-plane switching mode liquid crystal display device in an ON state.
Figure 1B:
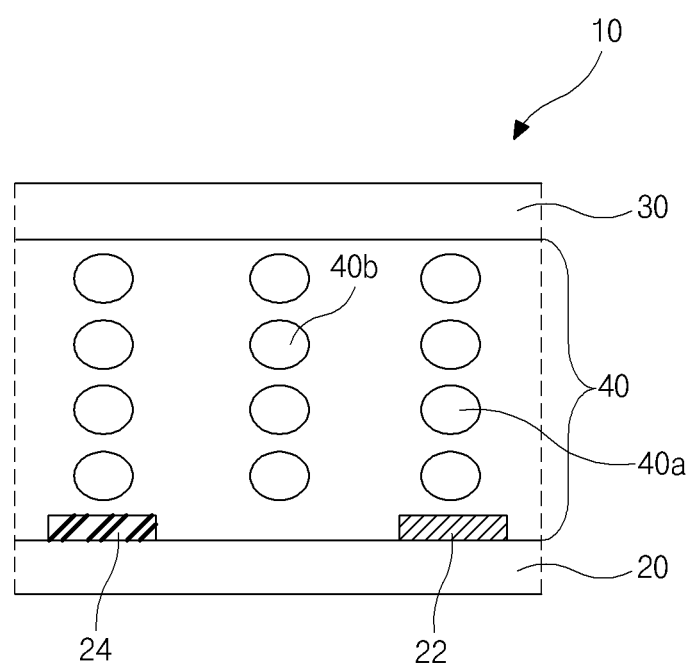
FIG. 1B is a cross-sectional view of the related art in-plane switching mode liquid crystal display device in an OFF state.
Figure 2:
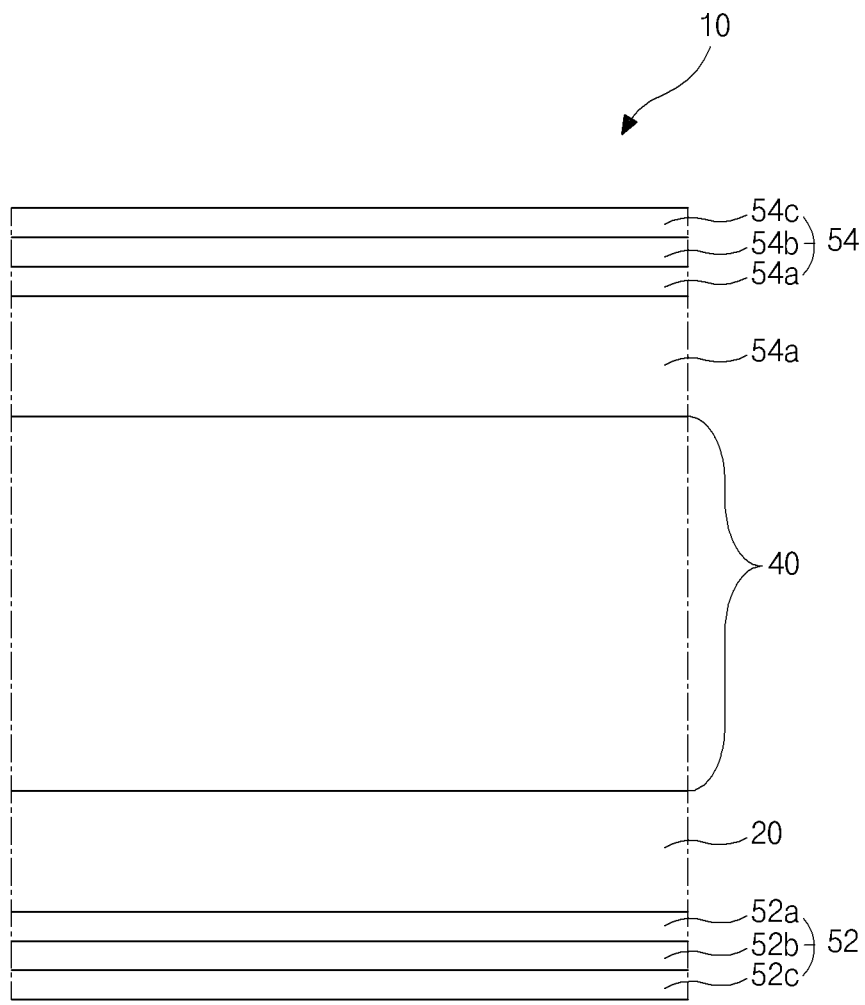
FIG. 2 is a cross-sectional view showing an in-plane switching mode liquid crystal display device according to the related art.
Figure 3A:
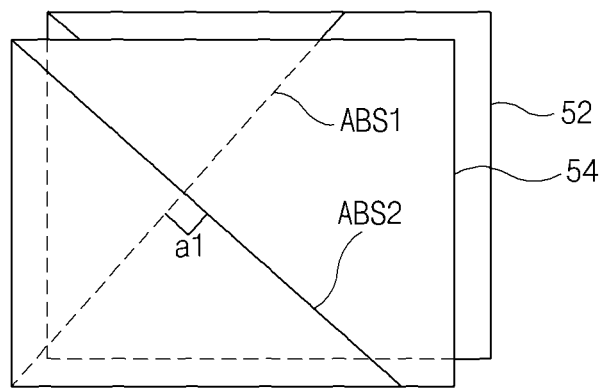
FIGS. 3A and 3B are views showing absorption axes of polarizing plates of an in-plane switching mode liquid crystal display device according to the related art when viewed at a normal viewing angle and at an oblique viewing angle, respectively.
Figure 3B:
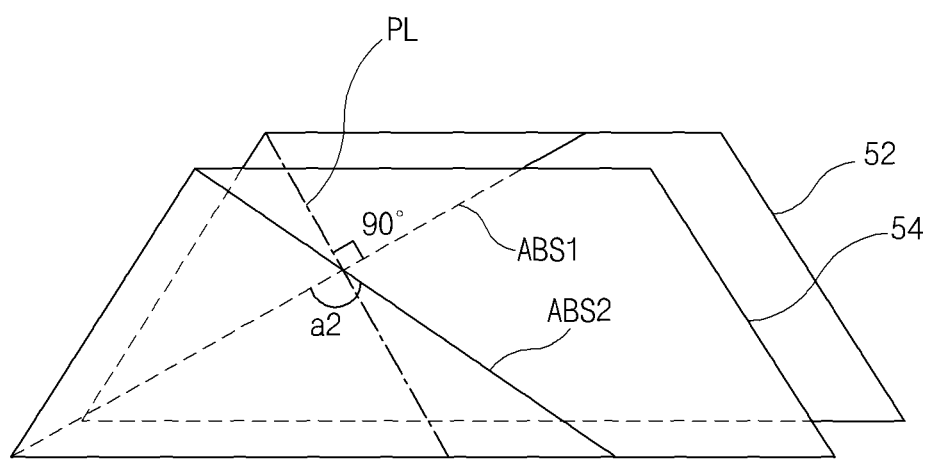
Figure 4:
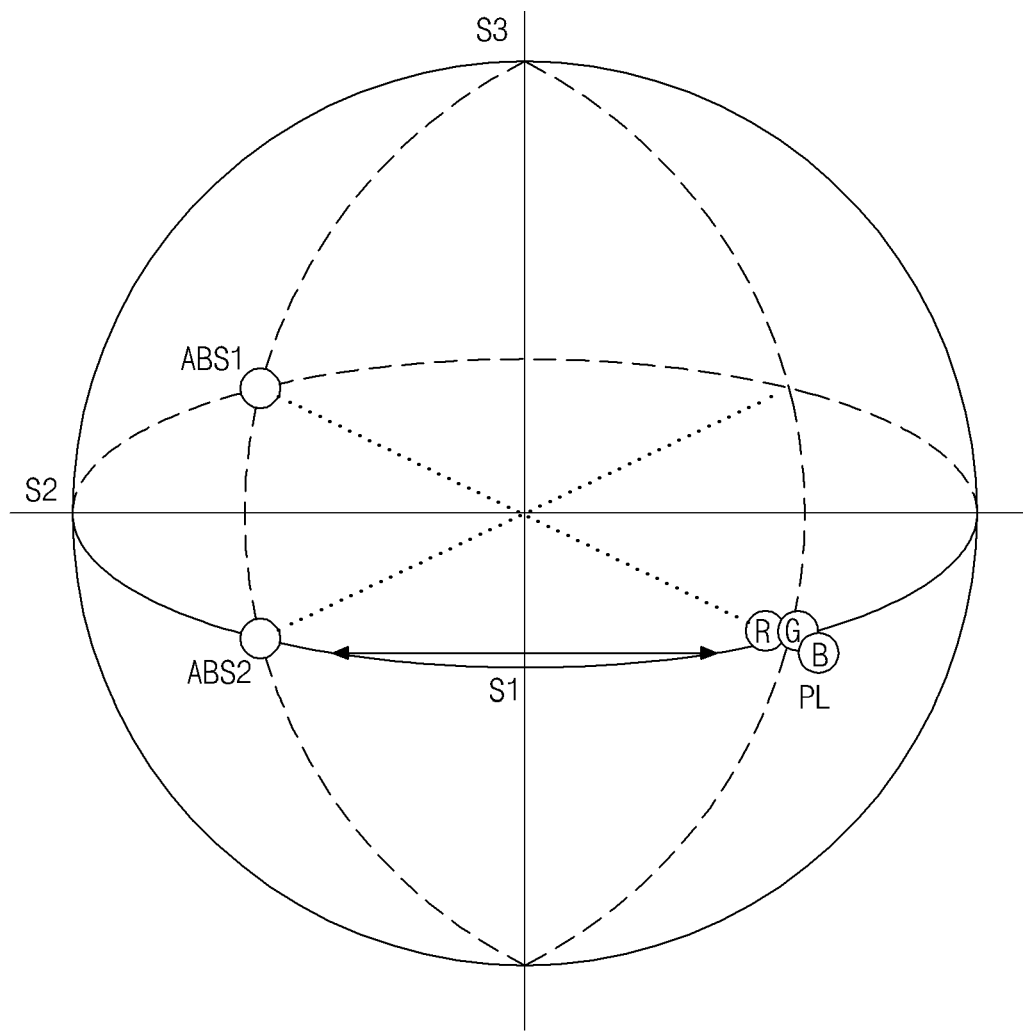
FIG. 4 is a Poincare sphere showing polarization states of obliquely incident light to an in-plane switching mode liquid crystal display device according to the related art.
Figure 5:
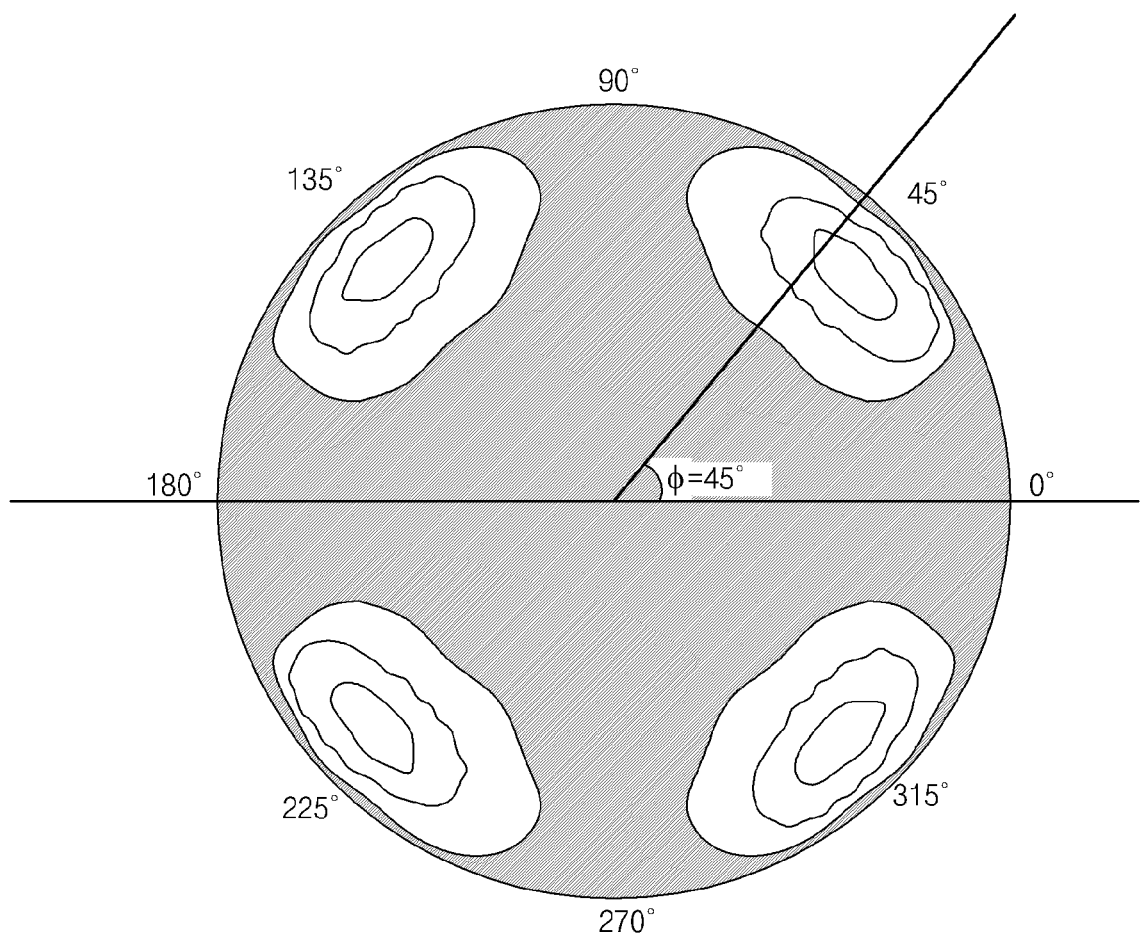
FIG. 5 is a view showing a brightness contour line of a black image with respect to a viewing angle in an in-plane switching mode liquid crystal display device according to the related art.
Figure 6:
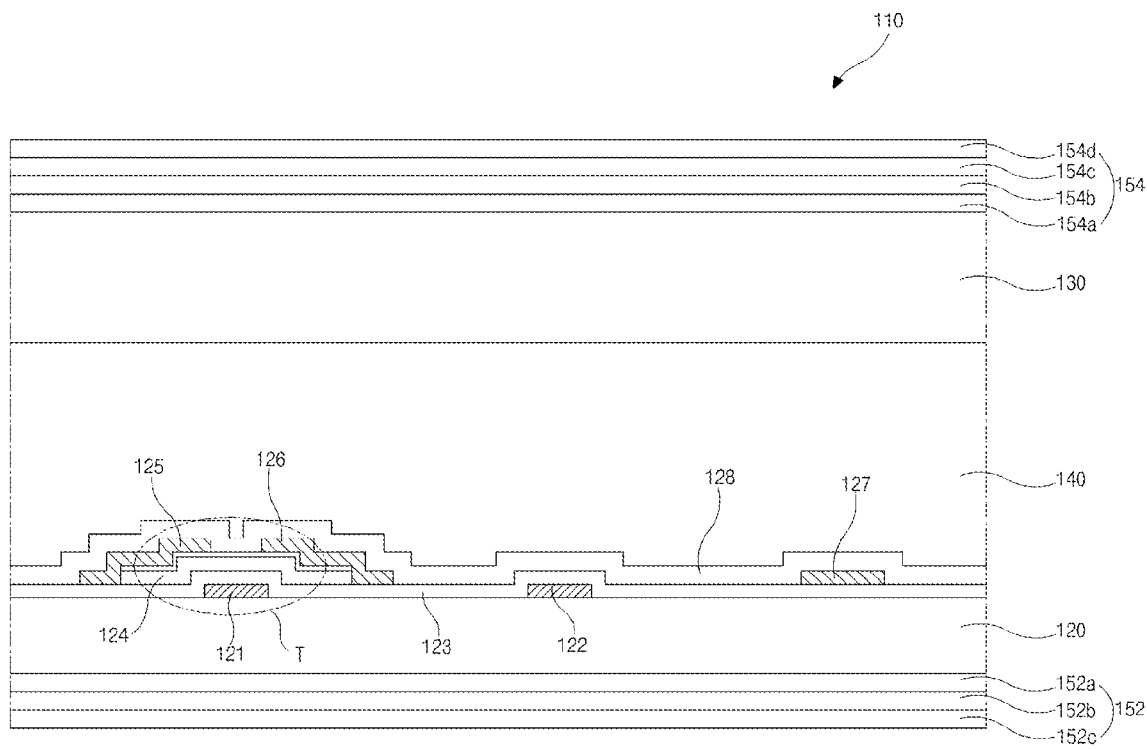
FIG. 6 is a cross-sectional view showing an in-plane switching mode liquid crystal display device according to a first embodiment of the present invention.

FIG. 6 is a cross-sectional view showing an in-plane switching mode liquid crystal display device according to a first embodiment of the present invention.

In FIG. 6, an in-plane switching (IPS) mode liquid crystal display (LCD) device 110 includes first and second substrates 120 and 130 facing and spaced apart from each other and a liquid crystal layer 140 between the first and second substrates 120 and 130.

A gate electrode 121 and a common electrode 122 are formed on an inner surface of the first substrate 120, and a gate insulating layer 123 is formed on the gate electrode 121 and the common electrode 122. An active layer 124 including an intrinsic semiconductor layer and an impurity-doped semiconductor layer is formed on the gate insulating layer 123 over the gate electrode 121, and source and drain electrodes 125 and 126 spaced apart from each other are formed on the active layer 124. In addition, a pixel electrode 127 connected to the drain electrode 126 is formed on the gate insulating layer 123. The pixel electrode 127 and the common electrode 122 are disposed to be horizontally spaced apart from each other. The gate electrode 121, the active layer 124, the source electrode 125 and the drain electrode 126 constitute a thin film transistor (TFT) T.

Although not shown in FIG. 6, a gate line and a data line are formed over the inner surface of the first substrate 120, and the TFT T is connected to the gate line and the data line. Further, a data signal of the data line is applied to the pixel electrode 127 according to a gate signal of the gate line by the TFT T. A passivation layer 128 is formed on the source electrode 125, the drain electrode 126 and the pixel electrode 127. A liquid crystal layer 140 is formed between the passivation layer 128 and an inner surface of the second substrate 130.

First and second polarizing plates 152 and 154 are formed on outer surfaces of the first and second substrates 120 and 130, respectively. Although not shown in FIG. 6, adhesive layers may be formed between the first substrate 120 and the first polarizing plate 152 and between the second substrate 130 and the second polarizing plate 154 for attachment.

The first polarizing plate 152 includes a first supporting layer 152a, a first polarizing layer 152b and a first protecting layer 152c. The first supporting layer 152a may include triacetyl cellulose (TAC) having a retardation of about 0. The first polarizing layer 152b substantially determining a polarization property may be formed by stretching poly-vinyl alcohol (PVA) adsorbing iodine (I) or dye. In addition, the first protecting layer 152c may include TAC.

The second polarizing plate 154 includes a first compensating layer 154a, a second compensating layer 154b, a second polarizing layer 154c and a second protecting layer 154d. The first compensating layer 154a includes a positive biaxial retardation film and may be formed by stretching an acrylic resin film such as a polymethyl methacrylate (PMMA) film. The second compensating layer 154b includes a negative biaxial retardation film and may be formed by stretching a cyclo-olefin polymer (COP) film. In addition, the second polarizing layer 154c substantially determining a polarization property may be formed by stretching poly-vinyl alcohol (PVA) adsorbing iodine (I) or dye, and the second protecting layer 154d may include TAC.

Hereinafter, the retardation film for the first and second compensating layers 154a and 154b of the second polarizing plate 154 will be illustrated.

Figure 7A:
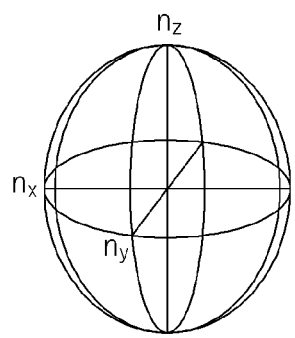
FIGS. 7A and 7B are views illustrating positive and negative biaxial retardation films, respectively, for a polarizing plate of an in-plane switching mode liquid crystal display device according to a first embodiment of the present invention.
Figure 7B:
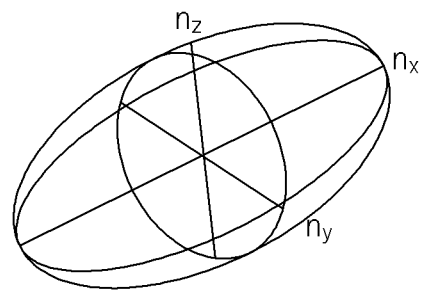

FIGS. 7A and 7B are views illustrating positive and negative biaxial retardation films, respectively, for a polarizing plate of an in-plane switching mode liquid crystal display device according to a first embodiment of the present invention.

A retardation film may be classified into uniaxial and biaxial types according to the number of optical axes. In addition, a retardation film may be classified into positive and negative types according to difference between refractive indexes along an optical axis direction and along the other direction different than the optical axis direction. For example, a retardation film having one optical axis may be classified under a uniaxial type and a retardation film having two optical axes may be classified under a biaxial type. In addition, a retardation film where a refractive index along an optical axis direction is greater than a refractive index along the other direction may be classified under a positive type, and a retardation film where a refractive index along an optical axis direction is smaller than a refractive index along the other direction may be classified under a negative type.

A retardation film may be represented by refractive indexes along directions in an xyz coordinate. For example, when a retardation film is located in an xy plane, the x axis and the y axis represent a plane direction of the retardation film, and the retardation film has refractive indexes of nx, ny and nz along the x, y and z axes, respectively. In addition, the retardation value of the retardation film along the plane direction, i.e., along the x axis or the y axis, is denoted by Rin, which is defined by (nx−ny) and may be referred to as an plane directional retardation value, and the retardation value of the retardation film along a thickness direction, i.e., along the z axis, is denoted by Rth, which is defined by (nz−nx) or (nz−ny) and may be referred to as a thickness directional retardation value. A positive A-plate and a negative A-plate of a uniaxial retardation film satisfy relations of (nx>ny=nz) and (nx ny=nz), respectively. Further, a positive C-plate and a negative C-plate satisfy relations of (nz>nx=ny) and (nz nx=ny), respectively. Moreover, as shown in FIGS. 7A and 7B, a positive B-plate and a negative B-plate of a biaxial retardation film satisfy relations of (nz>nx>ny) and (nx>ny>nz), respectively.

The first and second compensating layers 154a and 154b (of FIG. 6) in the second polarizing plate 154 of the IPS mode LCD device 110 (of FIG. 6) may be formed of the positive and negative B-plates of FIGS. 7A and 7B, respectively. In the IPS mode LCD device 110, since the obliquely incident light passes through the first polarizing plate 152 and the polarization state of the obliquely incident light is changed by the first and second compensating layers 154a and 154b of the second polarizing plate 154, the obliquely incident light is completely absorbed by the second polarizing layer 154c of the second polarizing plate 154.

Figure 8:
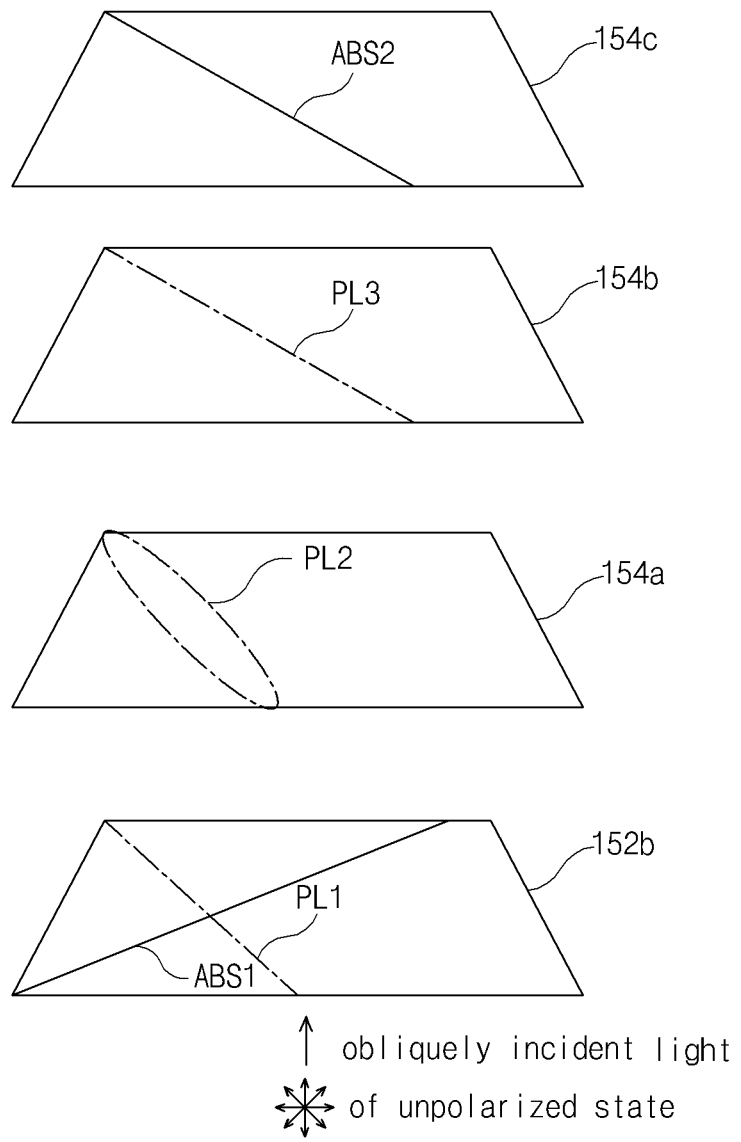
FIG. 8 is an exploded perspective view showing an absorption axis of a polarizing plate and polarization states of incident light passing through the polarization plate of an in-plane switching mode liquid crystal display device according to a first embodiment of the present invention.
Figure 9:
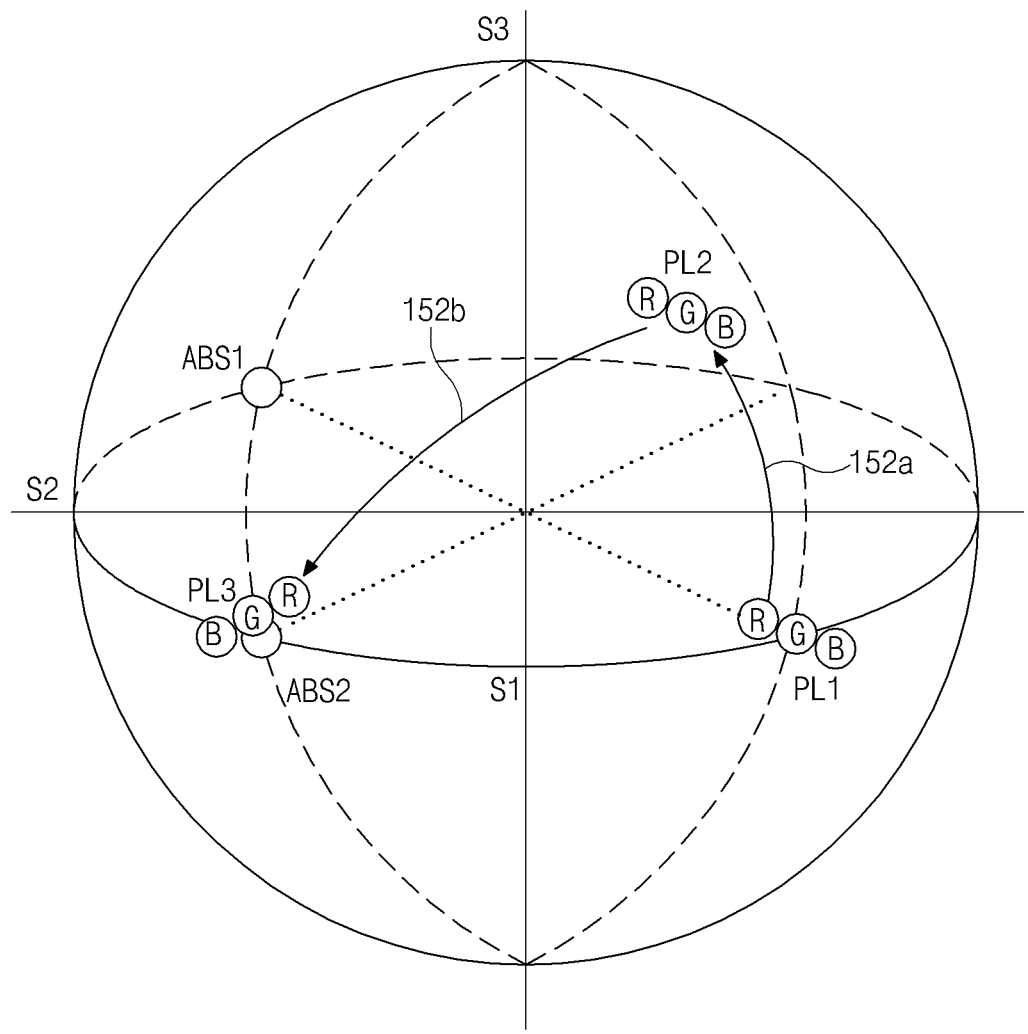
FIG. 9 is a Poincare sphere showing polarization states of obliquely incident light to an in-plane switching mode liquid crystal display device according to a first embodiment of the present invention.
Figure 10:
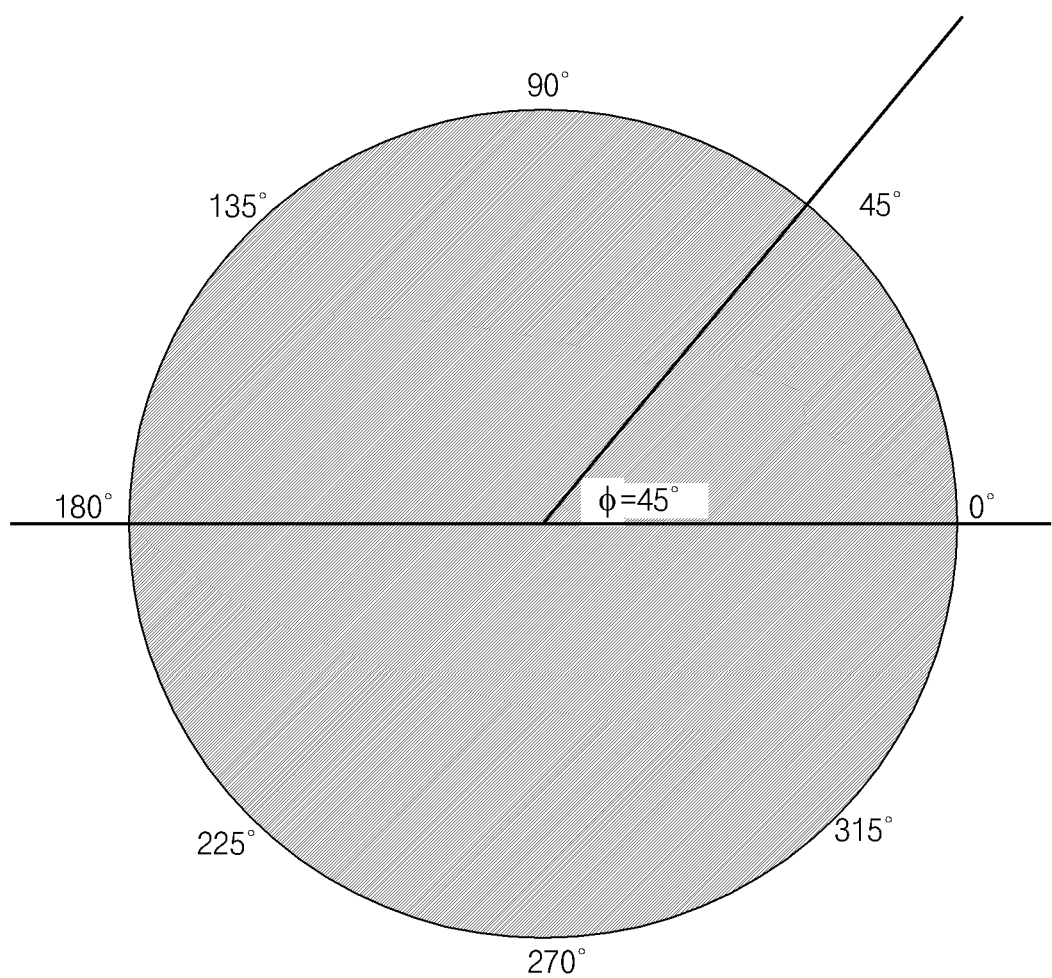
FIG. 10 is view showing a brightness contour line of a black image with respect to a viewing angle in an in-plane switching mode liquid crystal display device according to a first embodiment of the present invention.

FIG. 8 is an exploded perspective view showing an absorption axis of a polarizing plate and polarization states of incident light passing through the polarization plate of an in-plane switching mode liquid crystal display device according to a first embodiment of the present invention, FIG. 9 is a Poincare sphere showing polarization states of obliquely incident light to an in-plane switching mode liquid crystal display device according to a first embodiment of the present invention, and FIG. 10 is view showing a brightness contour line of a black image with respect to a viewing angle in an in-plane switching mode liquid crystal display device according to a first embodiment of the present invention.

In FIG. 8, while passing through a first polarizing plate 152b having a first absorption axis ABS1, an obliquely incident light of an unpolarized state to an in-plane switching (IPS) mode liquid crystal display (LCD) device 110 (of FIG. 6) is linearly polarized to have a first polarization state having a first polarization axis PL1 such that a polarization component parallel to the first absorption axis ABS1 is removed and a polarization component perpendicular to the first absorption axis ABS1 remains. In addition, the light of the first polarization state is elliptically polarized to have a second polarization state having a rotating second polarization axis PL2 while passing through a first compensating layer 154a of a second polarizing plate 154 (of FIG. 6), and the light of the second polarization state is linearly polarized to have a third polarization state having a third polarization axis PL3 while passing through a second compensating layer 154b of the second polarizing plate 154. Since the third polarization axis PL3 is parallel to a second absorption axis ABS2 of a second polarizing layer 154c of the second polarizing plate 154, the light of the third polarization state is absorbed by the second polarizing plate 154. As a result, the obliquely incident light is completely absorbed and the IPS mode LCD device 110 displays a black image. Each of optical axes of the first and second compensating layers 154a and 154b is parallel to the first absorption axis ABS1 and perpendicular to the second absorption axis ABS2.

Although the first absorption axis ABS1 of the first polarizing layer 152b is not perpendicular to the second absorption axis ABS2 of the second polarizing layer 152c at an oblique viewing angle of the IPS mode LCD device 110, the obliquely incident light has the first polarization state having the first polarization axis PL1 perpendicular to the first absorption axis ABS1 after passing through the first polarizing layer 152b and has the third polarization state having the third polarization axis PL3 parallel to the second absorption axis ABS2 after passing through the first and second compensating layers 154a and 154b. Accordingly, the obliquely incident light is completely absorbed by the second polarizing layer 154c.

The Poincare sphere representing all polarization states of light on a sphere has been widely used for designing a compensation film because polarization states are easily anticipated by using the Poincare sphere when an optical axis and a retardation value are given. An equator of the Poincare sphere represents a linear polarization. A positive third pole S3 and a negative third pole −S3 represent a left handed circular polarization and a right handed circular polarization, respectively. In addition, an upper hemisphere and a lower hemisphere represent a left handed elliptical polarization and a right handed elliptical polarization, respectively.

In FIG. 9, red, green and blue (R, G and B) obliquely incident lights are linearly polarized by the first polarizing plate 152 having the first absorption axis ABS1 to have the first polarization state having the first polarization axis PL1 that is located adjacent to the equator of the Poincare sphere. In addition, the R, G and B obliquely incident lights is elliptically polarized by the first compensating layer 152a to have the second polarization state having the rotating second polarization axis PL2 that has the same longitude as the first polarization axis PL1 on the Poincare sphere, and is linearly polarized by the second compensating layer 152b to have the third polarization state having the third polarization axis PL3 that is located adjacent to the equator of the Poincare sphere. Since the third polarization axis PL3 has substantially the same coordinates as the second absorption axis ABS2 of the second polarizing plate 154, the R, G and B obliquely incident lights may be completely absorbed by the second polarizing plate 154. As a result, the IPS mode LCD device 110 displays the black image even with the obliquely incident light, and quality of the black image and contrast ratio of the IPS mode LCD device 110 are improved.

In FIG. 10, when the IPS mode LCD device 110 displays a black image, a complete black image without light leakage is viewed at oblique viewing angles along diagonal directions having azimuthal angles φ of about 45°, 135°, 225° and 315° as well as at a normal viewing angle having a polar angle θ of about 0°. For example, the black image may have a brightness of about 0.000898 (arbitrary unit: A.U.) at an oblique viewing angle having a polar angle θ of about 60° and an azimuthal angle φ of about 45°. Accordingly, at the oblique viewing angle, the brightness of the black image may be reduced to about 5% of the brightness of the black image, which may be about 0.018331, of the related art IPS mode LCD device. Therefore, the brightness of the black image and the contrast ratio are improved at the oblique viewing angles of the IPS mode LCD device of the first embodiment of the present invention.

The retardation values of the first and second compensating layers 154a and 154b may be determined according to the minimum value of the brightness of the black image at the oblique viewing angles.

Figure 11:
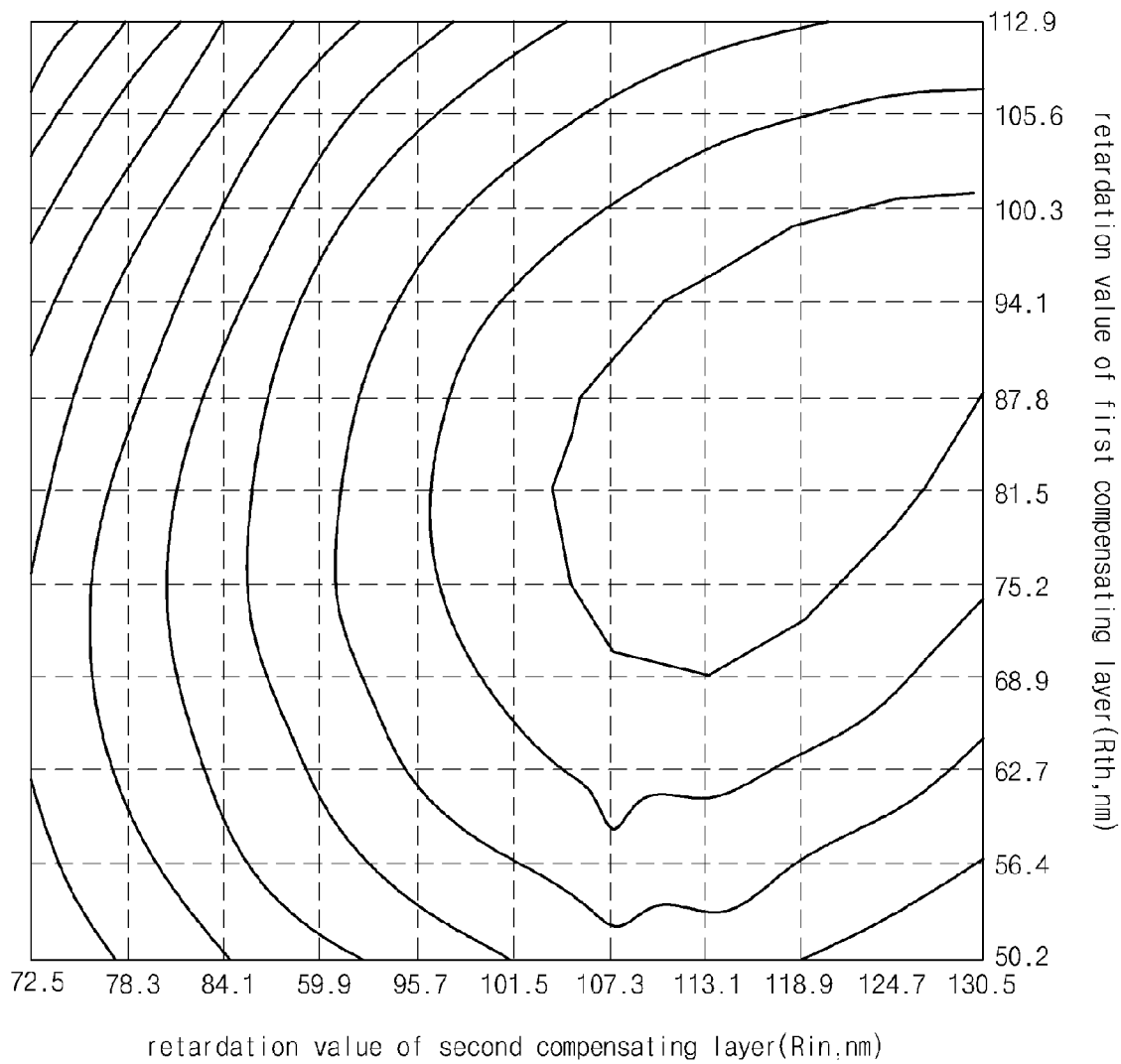
FIG. 11 is a view showing brightness distribution at an oblique viewing angle with respect to retardation values of first and second compensating layers of an in-plane switching mode liquid crystal display device according to a first embodiment of the present invention.

FIG. 11 and TABLE 1 are a view and a table, respectively, showing brightness distribution at an oblique viewing angle with respect to retardation values of first and second compensating layers of an in-plane switching mode liquid crystal display device according to a first embodiment of the present invention.

TABLE 1

|  |  | second compensating layer (Rin, nm) | | | | |
|---|---|---|---|---|---|---|
|  |  | 80 | 90 | 100 | 115 | 125 |
| first compensating layer (Rth, nm) | 50 | 6316 | 5003 | 4033 | 3671 | 4420 |
|  | 60 | 5447 | 3826 | 3623 | 2197 | 2939 |
|  | 70 | 5265 | 3494 | 2180 | 1613 | 2347 |
|  | 80 | 5405 | 3347 | 1819 | 898 | 1464 |
|  | 90 | 5728 | 3532 | 1936 | 1088 | 1173 |

In FIG. 11 and TABLE 1, the brightness of the black image is minimized when a retardation value Rth of the positive B-plate of the first compensating layer 154a (of FIG. 6) along a thickness direction (z axis) is within a range of bout 60 nm to about 100 nm and a retardation value Rin of the negative B-plate of the second compensating layer 154b (of FIG. 6) along a plane direction (x axis or y axis) is within a range of about 90 nm to about 130 nm. For example, when the retardation value Rth of the first compensating layer 154a is within a range of about 70 nm to about 90 nm and the retardation value Rin of the second compensating layer 154b is within a range of about 90 nm to about 110 nm, the black image may have the minimum brightness.

Figure 12:
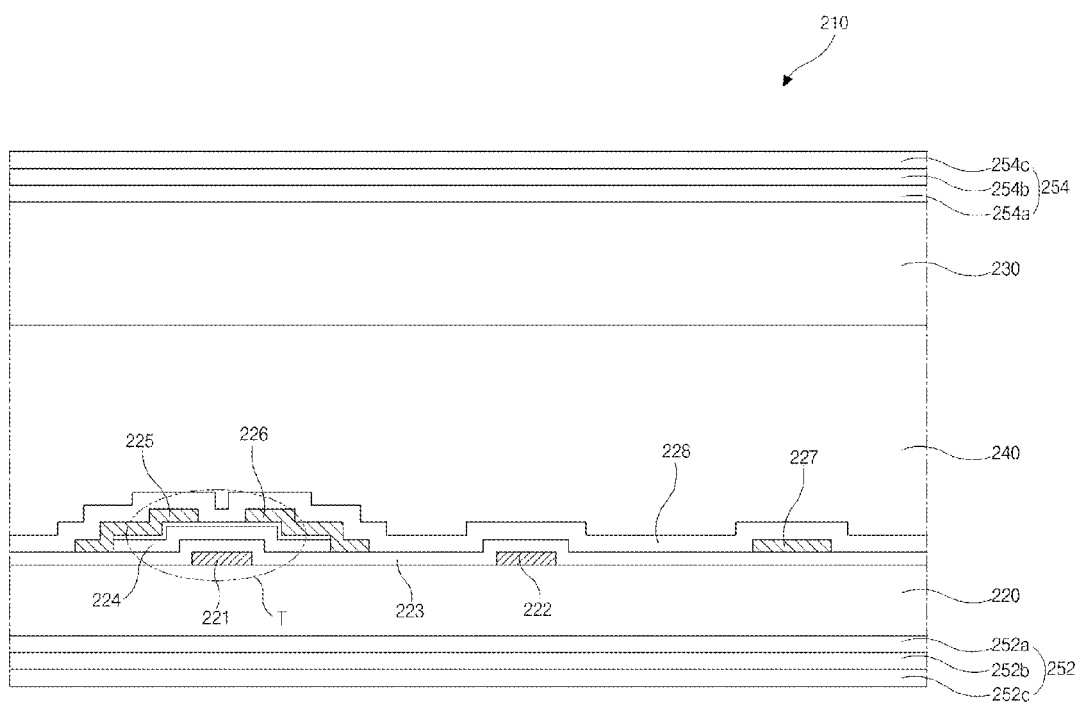
FIG. 12 is a cross-sectional view showing an in-plane switching mode liquid crystal display device according to a first embodiment of the present invention.

FIG. 12 is a cross-sectional view showing an in-plane switching mode liquid crystal display device according to a second embodiment of the present invention.

In FIG. 12, an in-plane switching (IPS) mode liquid crystal display (LCD) device 210 includes first and second substrates 220 and 230 facing and spaced apart from each other and a liquid crystal layer 240 between the first and second substrates 220 and 230.

A gate electrode 221 and a common electrode 222 are formed on an inner surface of the first substrate 220, and a gate insulating layer 223 is formed on the gate electrode 221 and the common electrode 222. An active layer 224 including an intrinsic semiconductor layer and an impurity-doped semiconductor layer is formed on the gate insulating layer 223 over the gate electrode 221, and source and drain electrodes 225 and 226 spaced apart from each other are formed on the active layer 224. In addition, a pixel electrode 227 connected to the drain electrode 226 is formed on the gate insulating layer 223. The pixel electrode 227 and the common electrode 222 are disposed to be horizontally spaced apart from each other. The gate electrode 221, the active layer 224, the source electrode 225 and the drain electrode 226 constitute a thin film transistor (TFT) T.

Although not shown in FIG. 12, a gate line and a data line are formed over the inner surface of the first substrate 220, and the TFT T is connected to the gate line and the data line. Further, a data signal of the data line is applied to the pixel electrode 227 according to a gate signal of the gate line by the TFT T. A passivation layer 228 is formed on the source electrode 225, the drain electrode 126 and the pixel electrode 227. A liquid crystal layer 240 is formed between the passivation layer 228 and an inner surface of the second substrate 230.

First and second polarizing plates 252 and 254 are formed on outer surfaces of the first and second substrates 220 and 230, respectively. Although not shown in FIG. 12, adhesive layers may be formed between the first substrate 220 and the first polarizing plate 252 and between the second substrate 230 and the second polarizing plate 254 for attachment.

The first polarizing plate 252 includes a first compensating layer 252a, a first polarizing layer 252b and a first protecting layer 252c. The first compensating layer 252a may include a positive biaxial retardation film and may be formed by stretching an acrylic resin film such as a polymethyl methacrylate (PMMA) film. The first polarizing layer 252b substantially determining a polarization property may be formed by stretching poly-vinyl alcohol (PVA) adsorbing iodine (I) or dye. In addition, the first protecting layer 252c may include TAC.

The second polarizing plate 254 includes a second compensating layer 254a, a second polarizing layer 254b and a second protecting layer 254c. The second compensating layer 254a includes a positive biaxial retardation film and may be formed by stretching an acrylic resin film such as a polymethyl methacrylate (PMMA) film. The second polarizing layer 254b substantially determining a polarization property may be formed by stretching poly-vinyl alcohol (PVA) adsorbing iodine (I) or dye, and the second protecting layer 254c may include TAC.

Each of the first and second compensating layers 252a and 254a of the first and second polarizing plates 252 and 254 may be formed of a positive B-plate satisfying a relation of nz>nx>ny. After the obliquely incident light to the IPS mode LCD device 210 passes through the first polarizing layer 252b of the first polarizing plate 252, the polarization state of the obliquely incident light is changed by the first and second compensating layers 252a and 254a of the first and second polarizing plates 252 and 254 to be completely absorbed by the second polarizing layer 254b of the second polarizing plate 254.

Figure 13:
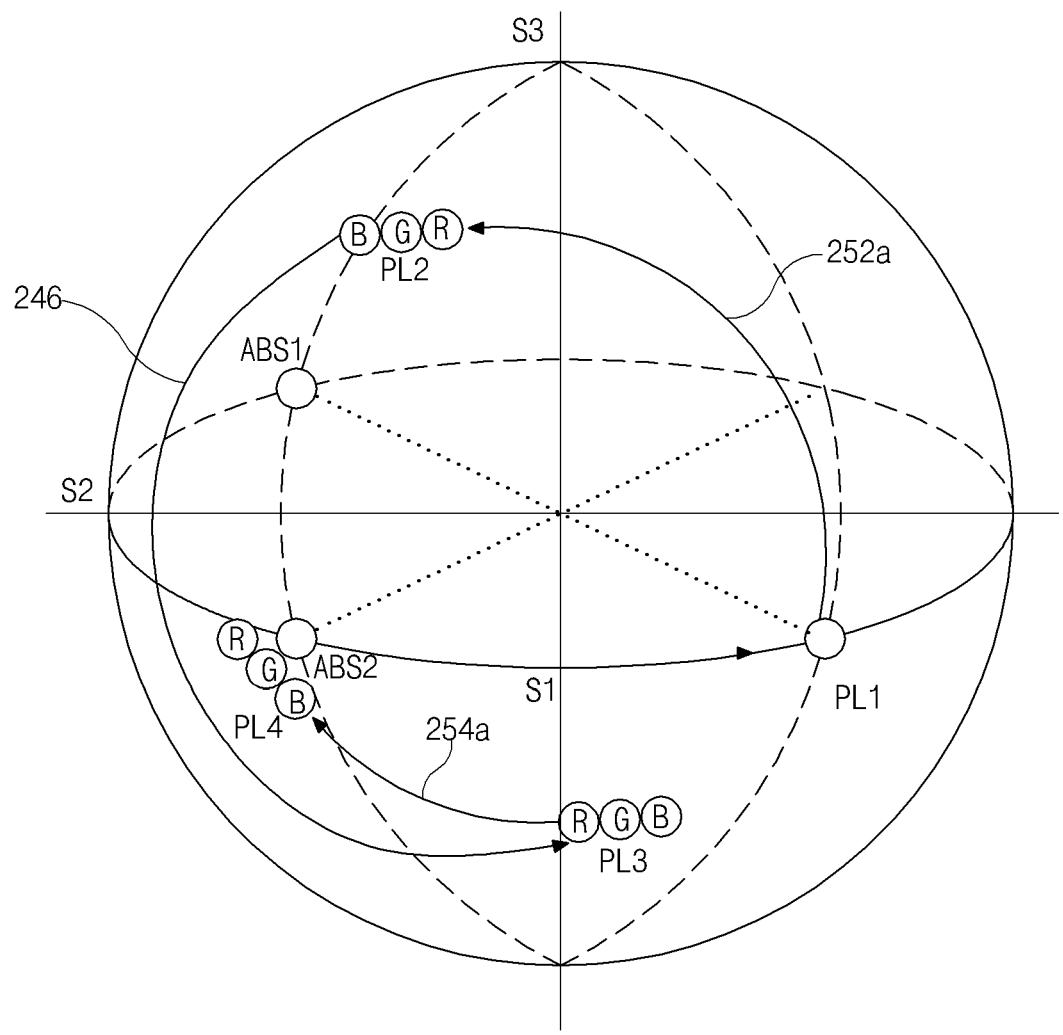
FIG. 13 is a Poincare sphere showing polarization states of obliquely incident light to an in-plane switching mode liquid crystal display device according to a second embodiment of the present invention.
Figure 14:
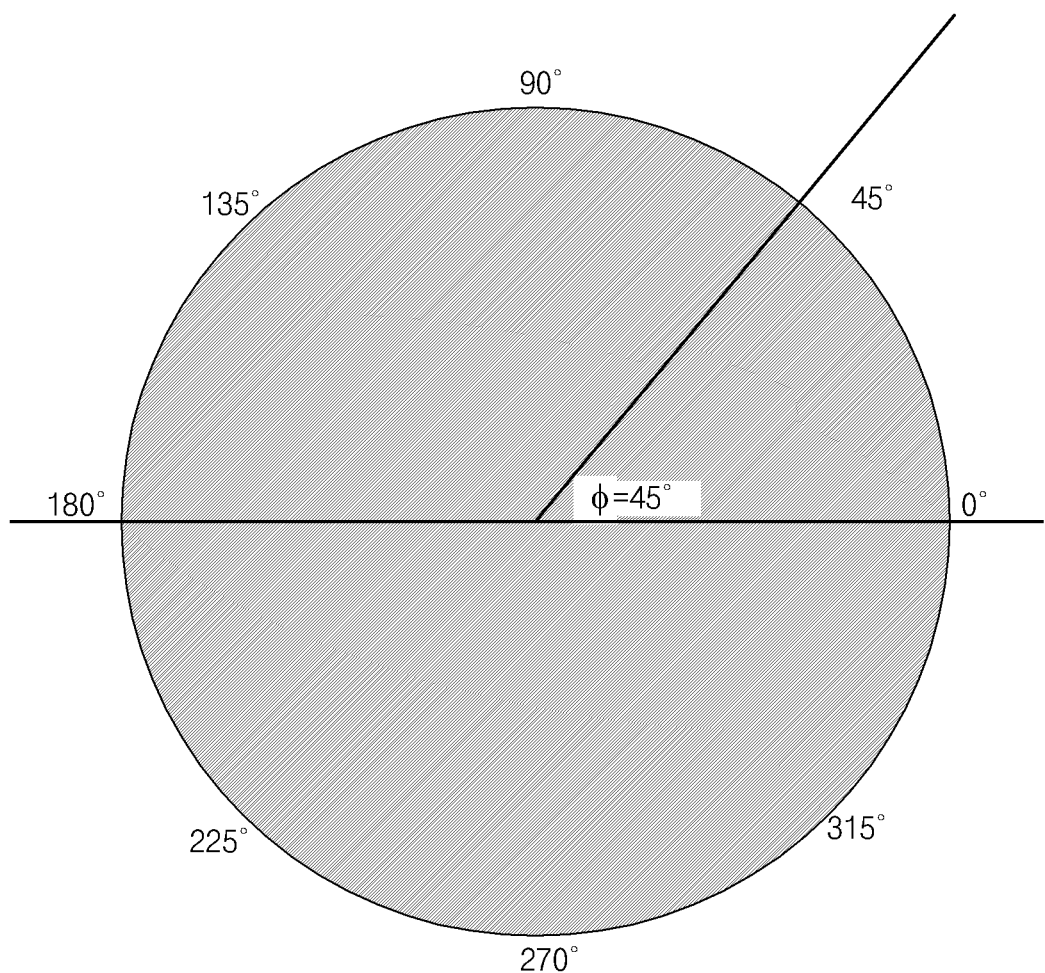
FIG. 14 is view showing a brightness contour line of a black image with respect to a viewing angle in an in-plane switching mode liquid crystal display device according to a second embodiment of the present invention.

FIG. 13 is a Poincare sphere showing polarization states of obliquely incident light to an in-plane switching mode liquid crystal display device according to a second embodiment of the present invention, and FIG. 14 is view showing a brightness contour line of a black image with respect to a viewing angle in an in-plane switching mode liquid crystal display device according to a second embodiment of the present invention.

In FIG. 13, while red, green and blue (R, G and B) obliquely incident lights of an unpolarized state pass through the first polarizing layer 252b (of FIG. 12) of the first polarizing plate 252 (of FIG. 12) having the first absorption axis ABS1, a component parallel to the first absorption axis ABS1 is absorbed and a component perpendicular to the first absorption axis ABS1 remains. As a result, the R, G and B obliquely incident lights have a first polarization state having a first polarization axis PL1 that is located adjacent to the equator of the Poincare sphere. In addition, the first polarization state of the R, G and B obliquely incident lights is changed to an elliptic second polarization state having the rotating second polarization axis PL2 while passing through the first compensating layer 252a (of FIG. 12) of the first polarizing plate 252, and the second polarization state of the R, G and B obliquely incident lights is changed to an elliptic third polarization state having a rotating third polarization axis PL3 while passing through the liquid crystal layer 240 (of FIG. 12). Further, the third polarization state of the R, G and B obliquely incident lights is changed to a to an elliptic fourth polarization state having the rotating fourth polarization axis PL4 while passing through the second compensating layer 254a (of FIG. 12) of the second polarizing plate 254 (of FIG. 12). Since the fourth polarization axis PL4 has substantially the same coordinates as the second absorption axis ABS2 of the second polarizing layer 254b, the R, G and B obliquely incident lights may be completely absorbed by the second polarizing plate 254. As a result, the IPS mode LCD device 210 displays the black image even with the obliquely incident light, and quality of the black image and contrast ratio of the IPS mode LCD device 210 are improved. An optical axis of the first compensating layer 252a is parallel to the first absorption axis ABS1 and perpendicular to the second absorption axis ABS2, and an optical axis of the second compensating layer 254a is perpendicular to the first absorption axis ABS1 and parallel to the second absorption axis ABS2.

In FIG. 14, when the IPS mode LCD device 210 displays a black image, a complete black image without light leakage is viewed at oblique viewing angles along diagonal directions having azimuthal angles φ of about 45°, 135°, 225° and 315° as well as at a normal viewing angle having a polar angle θ of about 0°. For example, the black image may have a brightness of about 0.001295 (arbitrary unit: A.U.) at an oblique viewing angle having a polar angle θ of about 60° and an azimuthal angle φ of about 45°. Accordingly, at the oblique viewing angle, the brightness of the black image may be reduced to about 7% of the brightness of the black image, which may be about 0.018331, of the related art IPS mode LCD device. Therefore, the brightness of the black image and the contrast ratio are improved at the oblique viewing angles of the IPS mode LCD device of the second embodiment of the present invention.

The retardation values of the first and second compensating layers 252a and 254a may be determined according to the minimum value of the brightness of the black image at the oblique viewing angles.

Figure 15:
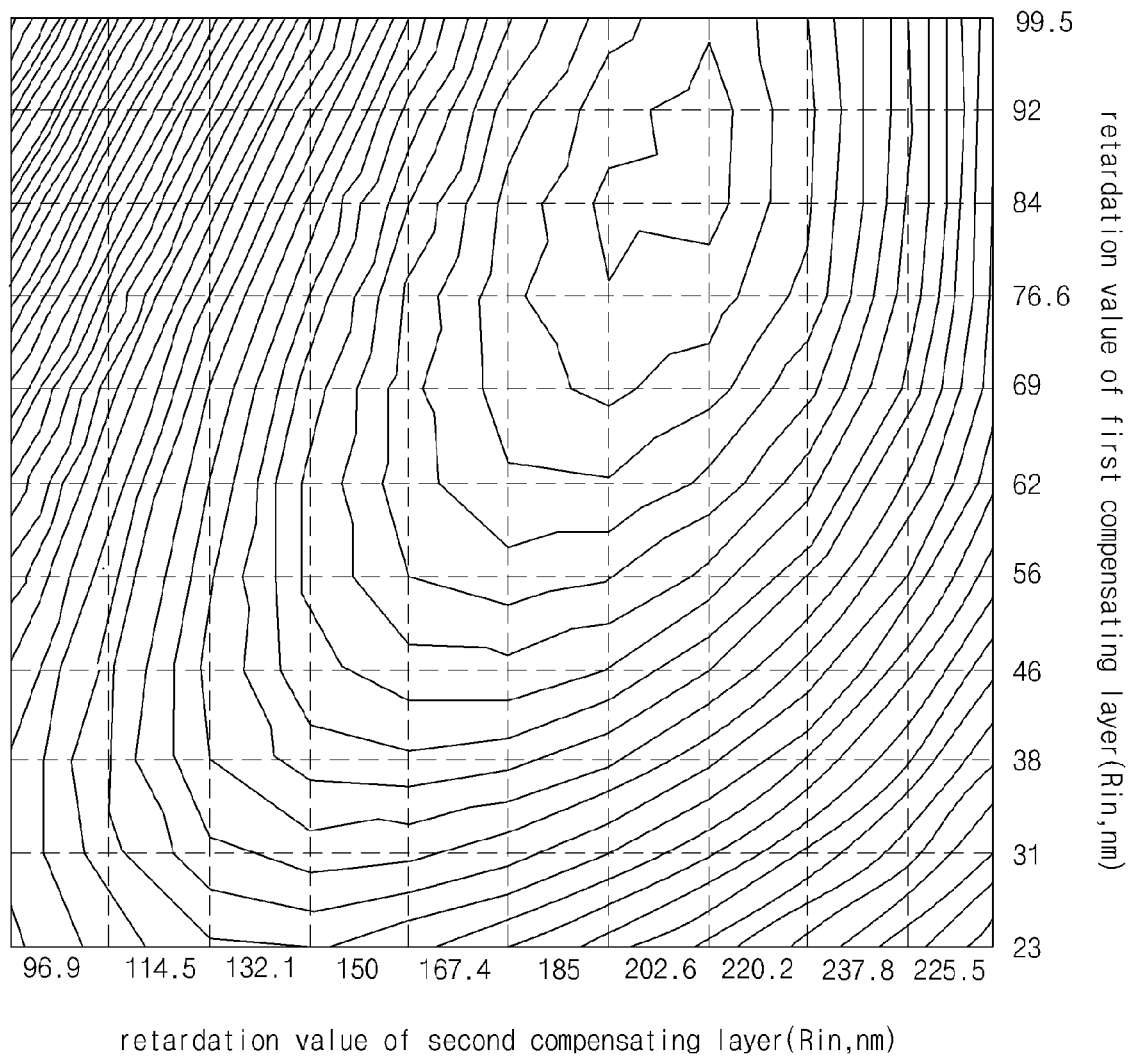
FIG. 15 is a view showing brightness distribution at an oblique viewing angle with respect to retardation values of first and second compensating layers of an in-plane switching mode liquid crystal display device according to a second embodiment of the present invention.

FIG. 15 and TABLE 2 are a view and a table, respectively, showing brightness distribution at an oblique viewing angle with respect to retardation values of first and second compensating layers of an in-plane switching mode liquid crystal display device according to a second embodiment of the present invention.

TABLE 2

|  |  | second compensating layer (Rin, nm) | | | | |
|---|---|---|---|---|---|---|
|  |  | 160 | 180 | 200 | 220 | 240 |
| first compensating layer (Rin, nm) | 65 | 4283 | 3284 | 3245 | 4181 | 6059 |
|  | 75 | 4213 | 2691 | 2234 | 2878 | 4607 |
|  | 85 | 5523 | 2866 | 1447 | 1349 | 3026 |
|  | 95 | 6886 | 3629 | 1829 | 1295 | 2958 |
|  | 105 | 8702 | 4876 | 2756 | 1760 | 3137 |

In FIG. 15 and TABLE 2, the brightness of the black image is minimized when a retardation value Rin of the positive B-plate of the first compensating layer 252a (of FIG. 12) along a plane direction (x axis or y axis) is within a range of bout 60 nm to about 110nm and a retardation value Rin of the positive B-plate of the second compensating layer 254a (of FIG. 12) along a plane direction (x axis or y axis) is within a range of about 170 nm to about 240 nm. For example, when the retardation value Rin of the first compensating layer 252a is within a range of about 80 nm to about 100 nm and the retardation value Rin of the second compensating layer 254b is within a range of about 190 nm to about 220 nm, the black image may have the minimum brightness.

Consequently, in the IPS mode LCD device according to the present invention, since each of the first and second polarizing plates includes a biaxial retardation film, the obliquely incident light is compensated and the light leakage at the oblique viewing angle is prevented. As a result, the brightness of the black image at the oblique viewing angle is reduced, and the contrast ratio of the IPS mode LCD device at the oblique viewing angle is improved, thereby the display quality improved.

It will be apparent to those skilled in the art that various modifications and variations can be made in the IPS mode LCD device and the method of fabricating the IPS mode LCD device of the present invention without departing from the spirit or scope of the invention. Thus, it is intended that the present invention cover the modifications and variations of this invention provided they come within the scope of the appended claims and their equivalents.

What is claimed is:

1. An in-plane switching mode liquid crystal display device, comprising:
    first and second substrates facing and spaced apart from each other;
    a first polarizing plate including a supporting layer, a first polarizing layer and a first protecting layer sequentially on an outer surface of the first substrate;
    a second polarizing plate including a first compensating layer, a second compensating layer, a second polarizing layer and a second protecting layer sequentially on an outer surface of the second substrate, the first and second compensating layers including positive and negative biaxial retardation films, respectively, the first compensating layer comprising a positive B-plate satisfying a relation of nz>nx>ny, the second compensating layer comprising a negative B-plate satisfying a relation of nx>ny>nz, nx, ny, and nz representing refractive indexes of each of the first and second compensating layers along the x, y, and z axes, respectively, the x and y axes representing a plane direction of each of the first and second compensating layers, the z-axis representing a thickness direction of each of the first and second compensating layers; and
    a liquid crystal layer between the first and second substrates.

2. The device according to claim 1, wherein the first compensating layer has a thickness directional retardation value (Rth) within a range of bout 60 nm to about 100 nm and the second compensating layer has a plane directional retardation value (Rin) within a range of about 90 nm to about 130 nm.

3. The device according to claim 1, wherein the first compensating layer includes a stretched polymethyl methacrylate (PMMA) film and the second compensating layer includes a stretched cyclo-olefin polymer (COP) film.

4. The device according to claim 1, wherein the supporting layer includes tri-acetyl cellulose (TAC) having a retardation of about 0, wherein each of the first and second polarizing layers includes a stretched poly-vinyl alcohol (PVA) adsorbing one of iodine (I) and dye, and wherein each of the first and second protecting layers includes tri-acetyl cellulose (TAC).

5. The device according to claim 1, wherein absorption axes of the first and second polarizing plates are perpendicular to each other, and wherein each of optical axes of the first and second compensating layers is parallel to the absorption axis of the first polarizing layer and perpendicular to the absorption axis of the second polarizing layer.

* * * * *